(12) United States Patent
Kimura et al.

(10) Patent No.: US 6,602,596 B2
(45) Date of Patent: Aug. 5, 2003

(54) LIGHT DIFFUSION SHEET

(75) Inventors: Yoshihisa Kimura, Saitama (JP); Kenji Fukui, Kashiwa (JP); Junji Ichinokawa, Saitama (JP); Teruo Ohnuma, Tokyo (JP)

(73) Assignee: Kimoto Co., Ltd. (JP)

( * ) Notice: Subject to any disclaimer, the term of this patent is extended or adjusted under 35 U.S.C. 154(b) by 0 days.

(21) Appl. No.: 09/854,609

(22) Filed: May 15, 2001

(65) Prior Publication Data

US 2002/0009573 A1 Jan. 24, 2002

(30) Foreign Application Priority Data

May 16, 2000 (JP) ......................................... 2000-143465

(51) Int. Cl.[7] .............................. B32B 3/00; B32B 5/16; G02B 5/18; G02B 13/20; G02B 5/02; G02B 27/00; G02F 1/13; G02F 1/1335

(52) U.S. Cl. ..................... 428/327; 428/142; 428/143; 428/172; 428/336; 359/28; 359/558; 359/559; 359/601; 359/615; 349/64; 349/201; 349/112

(58) Field of Search .................... 428/142, 172, 428/327, 336, 143; 359/28, 599, 558, 601–615; 349/64, 201, 112

(56) References Cited

U.S. PATENT DOCUMENTS

| | | | | |
|---|---|---|---|---|
| 5,706,134 A | * | 1/1998 | Konno et al. | 359/599 |
| 5,903,391 A | * | 5/1999 | Toshima et al. | 359/529 |
| 5,914,825 A | * | 6/1999 | Nishio et al. | 359/851 |
| 6,217,176 B1 | * | 4/2001 | Maekawa | 359/601 |

FOREIGN PATENT DOCUMENTS

JP       06059107 A    *    3/1994    ............ G02B/5/02

* cited by examiner

Primary Examiner—Harold Pyon
Assistant Examiner—Patricia L Nordmeyer
(74) Attorney, Agent, or Firm—Lorusso, Loud & Kelly

(57) ABSTRACT

There is provided a light diffusion sheet comprising a light diffusion layer formed on a transparent substrate and containing a binder resin and resin particles that impart an uneven surface, wherein the uneven surface of the light diffusion layer exhibits an arithmetical mean deviation of 2.0 μm or more in three-dimensional surface roughness measurement and/or ten point height of irregularities of 10.0 μm or more in three-dimensional surface roughness measurement. This light diffusion sheet is high luminance in the front direction, is excellent in light-diffusing property, and is resistant to damage.

21 Claims, 2 Drawing Sheets

LIGHT DIFFUSION SHEET

FIELD OF THE INVENTION

The present invention relates to a light diffusion sheet, in particular, a light diffusion sheet suitable for use in backlight units of liquid crystal displays.

BACKGROUND OF THE INVENTION

As light diffusion sheets used for backlight units of liquid crystal displays, there are conventionally used transparent plastic films applied on one surface with a transparent resin solution containing inorganic particles or resin particles dispersed therein.

Performance features required by such light diffusion sheets include invisibility of light diffusion patterns in the light conductive plates, high luminance in the front direction and so forth.

To realize these features, improvements have been made by selecting the type and content of the resin and light diffusion particles used in the light diffusion layers. However, the enhancement of luminance in the front direction that can be achieved by such improvements is limited. Therefore, attempts have been made to direct light in the peripheral direction toward the front direction by means of a prism sheet. Since such a prism sheet does not have light-diffusing ability, the practice has been to superimpose it on a conventional light diffusion sheet. Japanese Patent Unexamined Publication (Kokai) Nos. 9-127314 and 9-197109, for example, disclose light diffusion sheets which, being combined with a lens sheet called a prism sheet, provides enhanced luminance in the front direction compared with conventional light diffusion sheets, together with adequate light-diffusing property.

However, the uneven surfaces of the light diffusion layers of conventional light diffusion sheets are susceptible to damage during handling. Use of damaged light diffusion sheets in today's high-precision liquid crystal displays is unacceptable because even slight damage to the light diffusion sheet can result in a defective liquid crystal display. Therefore, when the backlight units of liquid crystal displays are produced using these light diffusion sheets, they must be handled with extreme care, and productivity is degraded in proportion.

Accordingly, an object of the present invention is to provide a light diffusion sheet that is high luminance in the front direction, is excellent in light-diffusing property, and is resistant to damage. A further object of the present invention it to provide a light diffusion sheet that is not susceptible to damage when used in a backlight unit of liquid crystal display and can ensure good performance of the liquid crystal display.

The light diffusion sheet of the present invention, which achieves the aforementioned objects, is a light diffusion sheet comprising a light diffusion layer laminated on a transparent substrate and containing a binder resin and resin particles that impart an uneven surface, wherein the uneven surface of the light diffusion layer exhibits an arithmetical mean deviation of 2.0 μm or more in three-dimensional surface roughness measurement.

The light diffusion sheet of the present invention is also a light diffusion sheet comprising a light diffusion layer laminated on a transparent substrate and containing a binder resin and resin particles that impart an uneven surface, wherein the uneven surface of the light diffusion layer exhibits a ten point height of irregularities of 10.0 μm or more in three-dimensional surface roughness measurement.

The arithmetical mean deviation and ten point height of irregularities in three-dimensional surface roughness measurement used with regard to the present invention are values measured by using a surface analysis apparatus (SAS-2010 SAU-II, produced by Meishin Koki Co., Ltd.) according to the methods for measurement of arithmetical mean deviation and ten point height of irregularities for two-dimensional surface roughness defined in JIS-B0601 provided that the methods are expanded to cover three-dimensional surface roughness.

In order to make the light diffusion layer surface resistant to damage, studies have been made so far to improve crosslinking density of the binder of the light diffusion layer and so forth, in particular, to increase hardness of the coated film by using an ionizing radiation hardening resin or the like. However, hardness of the coated film does not necessarily correspond to the resistance to damage on the coated film surface, and the resistance to damage as a light diffusion layer of light diffusion sheet has not been obtained yet hitherto.

Therefore, the inventors of the present invention noted the surface conditions, and assiduously studied. As a result, they found that damages of light diffusion layer surface of light diffusion sheet can be reduced in a degree that had not been obtained so far by controlling three-dimensional surface roughness of the uneven surface of light diffusion layer to be within a specific range, and they accomplished the present invention.

As in the light diffusion sheet of the present invention, when the arithmetical mean deviation of the uneven surface of light diffusion layer is 2.0 μm or more and/or the ten point height of irregularities of the same is 10.0 μm or more in three-dimensional surface roughness measurement, there can be provided a light diffusion sheet of which uneven surface of its light diffusion layer is resistant to damage, while exhibiting excellent luminance and light diffusing properties. In particular, when a backlight unit of liquid crystal display is produced by using the light diffusion sheet of the present invention, the uneven surface of the light diffusion layer becomes not susceptible to damage during handling. Such a light diffusion sheet can easily be handled even if it is large in size, and, therefore, it is extremely effective for the production of the large liquid crystal displays.

PREFERRED EMBODIMENTS OF THE INVENTION

Embodiments of the light diffusion sheet of the present invention will now be explained in detail with reference to the drawings.

Figure 1:
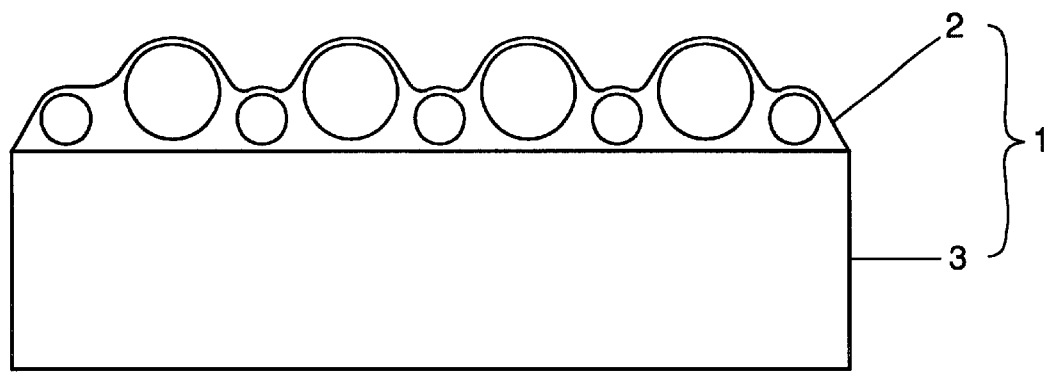
FIG. 1 shows a sectional view of an exemplary light diffusion sheet according to the present invention.

As shown in FIG. 1, the light diffusion sheet 1 of the present invention comprises a light diffusion layer 2 containing a binder resin and resin particles that impart an uneven surface, which layer is formed on a transparent substrate 3. The uneven surface of the light diffusion layer exhibits an arithmetical mean deviation of 2.0 μm or more and/or a ten point height of irregularities of 10.0 μm or more in three-dimensional surface roughness measurement. By making the surface roughness of the light diffusion layer 2 satisfy the aforementioned requirements, excellent luminance and light diffusing properties can be obtained while securing damage resistance of the uneven surface of the light diffusion layer 2.

To obtain luminance of the degree required for use of the light diffusion sheet 1 of the present invention in a backlight unit of a liquid crystal display, the light diffusion sheet 1 preferably has high total light transmission. The total light transmission is preferably 70.0% or more, more preferably 75.0% or more. Further, to obtain light-diffusing property of the degree required for use in a backlight unit of a liquid crystal display, the light diffusion sheet 1 also preferably as high haze. The haze is preferably 80.0% or more, more preferably 85.0% or more.

The total light transmission and haze mentioned above preferably fall within the above defined ranges as values measured by directing light onto the surface of the light diffusion sheet 1 opposite to the surface having the light diffusion layer 2 (this surface is referred to simply as the "back surface" in contrast to the surface having the light diffusion layer 2).

In the present invention, the total light transmission and haze are those defined in JIS-K7105, and they satisfy the following relationship: Td (%)/Tt (%)×100 (%)=H (%) [Td: diffused light transmission, Tt: total light transmission, H: haze].

The light diffusion sheet 1 of the present invention can be obtained by, for example, preparing a resin solution for forming a light diffusion layer comprising a binder resin and resin particles dispersed or dissolved in a solvent, applying the resin solution to a transparent support 3 by a conventional application method, and drying the solution to form a laminated film.

Examples of the binder resin usable for the light diffusion layer 2 include optically transparent thermoplastic resins, thermosetting resins, ionizing radiation hardening resins and so forth, such as polyester resins, acrylic resins, polyester acrylate resins, polyurethane acrylate resins, epoxy acrylate resins, cellulose resins, acetal resins, vinyl resins, polyethylene resins, polystyrene resins, polypropylene resins, polyamide resins, polyimide resins, melamine resins, phenol resins, silicone resins and fluorocarbon resins.

Among these resins, acrylic resins exhibiting weather resistance and high transparency are preferred, and two-pack type polyurethane acrylate resins are particularly preferred. Further, those having a high OH value, which provides high crosslinking density, are desirably used so that a tough coated film can be obtained even when a large amount of resin particles are contained.

As the resin particles, those having a substantially spherical shape and a mean particle diameter of 16.0–30.0 μm, preferably 18.0–28.0 μm, are used. If the mean particle diameter is less than 16.0 μm, the uneven surface of the light diffusion layer 2 cannot be sufficiently roughened and the damage resistance of the uneven surface of the light diffusion layer 2, a key feature of the present invention, cannot be obtained. Further, if it exceeds 30.0 μm, it becomes difficult to prepare and/or coat the resin solution for forming the light diffusion layer, and thus becomes difficult to obtain the high luminance and excellent light diffusion that are features of the present invention.

The resin particles also have a coefficient of variation of particle diameter distribution of less than 50.0%, preferably 45.0% or less. Further, the coefficient of variation is preferably 20.0% or more, more preferably 25.0% or more. With the range from 20.0% to 50.0% of the coefficient of variation of particle diameter distribution, excellent luminance and light diffusing properties can be obtained.

The mean particle diameter and the coefficient of variation of particle diameter distribution of the resin particles used in the present invention are represented as values measured by the Coulter-counter method. The Coulter-counter method is a method of electrically measuring number and size of particles dispersed in a solution. In the Coulter-counter method, particles are dispersed in an electrolytic solution and with the aid of an attractive force are passed through a small hole through which an electric current is passed. When the particles pass through the hole, the electrolytic solution is replaced with the particles by the volume of the particles, and resistance increases. In this case, voltage pulses whose levels are proportional to the particle volumes are produced. Thus, by electrically measuring the levels and number of the pulses, the number of the particles and the volumes of individual particles can be measured to ascertain the particle diameters and particle diameter distribution.

The coefficient of variation of particle diameter distribution is a value representing variation of the particle diameter distribution (degree of distribution). A larger coefficient of variation represents larger distribution. The coefficient of variation is represented as a percentage obtained by dividing the standard deviation of particle diameter distribution (square root of unbiased variance) by the arithmetical mean value of particle diameter (mean particle diameter) and multiplying the result by 100.

Examples of such resin particles as described above include acrylic resin particles, silicone resin particles, nylon resin particles, styrene resin particles, polyethylene resin particles, benzoguanamine resins particle, urethane resin particles and so forth.

The content of the resin particles cannot be absolutely defined, since it depends on the mean particle diameter of the resin particles and/or the thickness of the light diffusion layer 2 to be used. Generally speaking, however, the content is preferably 180–270 parts by weight, more preferably 200–250 parts by weight, with respect to 100 parts by weight of the binder resin. If the content is less than 180 parts by weight, it is difficult to obtain the arithmetical mean deviation of 2.0 μm or more and/or ten point height of irregularities of 10.0 μm or more when resin particles having smaller mean particle size. As a result, the light diffusion layer 2 becomes susceptible to damage. If the content exceeds 270 parts by weight, the strength of the coated film is lowered and the uneven surface of the light diffusion layer 2 may become susceptible to damage.

Although the thickness of the light diffusion layer 2 also varies depending on the mean particle diameter of the resin particles used and/or their content relative to the binder resin, it is preferably 25.0–50.0 μm, more preferably 30.0–40.0 μm.

When the thickness is in the range of 25.0–50.0 μm, the resin particles of a mean particle diameter in the above-defined range can be maintained in the light diffusion layer in a good state to provide the light diffusion layer exhibiting an arithmetical mean deviation of 2.0 μm or more and/or ten point height of irregularities of 10.0 μm or more and being resistant to damage, and excellent luminance and light diffusion properties can easily be obtained.

The "thickness" of the light diffusion layer 2 or the anti-Newton ring layer described hereinafter referred to in the present invention means a value measured according to JIS-K7130, 5.1.2, Method A-2, and it is an average of measured values for 5 or more measurement points.

As the transparent support 3 on which the light diffusion layer is formed, there can be used transparent plastic films, such as polyethylene films, polypropylene films, polyethylene terephthalate films, polycarbonate films and polymethyl methacrylate films. Among them, polyethylene terephthalate films are preferably used in view of weather resistance and processability.

The light diffusion sheet 1 of the present invention is preferably provided with an anti-Newton ring layer or other means for preventing Newton rings caused by close contact of the back surface of the sheet with the light conductive panel or the like. A suitable anti-Newton ring layer can be obtained by applying a coat of a binder resin containing particles having a mean particle diameter of about 10 $\mu$m in an amount of about 5 parts by weight with respect to 100 parts by weight of the binder resin to form a layer having a thickness of about 8–12 $\mu$m.

EXAMPLES

Examples of the present invention will be explained hereafter. "Part" and "%" are used on a weight basis unless otherwise indicated.

Example 1

A light diffusion sheet 1 of the structure shown in FIG. 1 was produced by applying a resin solution for light diffusion layer (a) having the following composition on one surface of a polyethylene terephthalate film 3 of a thickness of 100 $\mu$m (Lumirror T-60, Toray Industries, Inc.) and drying the solution to form a light diffusion layer 2 of a thickness of about 33 $\mu$m.

| <Resin solution for light diffusion layer (a)> | |
| --- | --- |
| Acryl polyol (solid content: 50%, Acrydic A-807, Dainippon Ink & Chemicals, Inc.) | 162 parts |
| Isocyanate (solid content: 60%, Takenate D110N, Takeda Chemical Industries, Ltd.) | 32 parts |
| Polymethyl methacrylate resin particles (mean particle diameter: 18.2 $\mu$m, coefficient of variation: 31.6%) | 220 parts |
| Butyl acetate | 215 parts |
| Methyl ethyl ketone | 215 parts |

Example 2

A light diffusion sheet 1 of the structure shown in FIG. 1 was produced by applying a resin solution for light diffusion layer (b) having the following composition on one surface of a polyethylene terephthalate film 3 of a thickness of 100 $\mu$m (Lumirror T-60, Toray Industries, Inc.) and drying the solution to form a light diffusion layer 2 of a thickness of about 40 $\mu$m.

| <Resin solution for light diffusion layer (b)> | |
| --- | --- |
| Acryl polyol (solid content: 50%, Acrydic A-807, Dainippon Ink & Chemicals, Inc.) | 162 parts |
| Isocyanate (solid content: 60%, Takenate D110N, Takeda Chemical Industries, Ltd.) | 32 parts |
| Polymethyl methacrylate resin particles (mean particle diameter: 27.3 $\mu$m, coefficient of variation: 42.5%) | 250 parts |
| Butyl acetate | 215 parts |
| Methyl ethyl ketone | 215 parts |

Example 3

A light diffusion sheet 1 of the structure shown in FIG. 1 was produced by applying a resin solution for light diffusion layer (c) having the following composition on one surface of a polyethylene terephthalate film 3 of a thickness of 100 $\mu$m (Lumirror T-60, Toray Industries, Inc.) and drying the solution to form a light diffusion layer 2 of a thickness of about 27 $\mu$m.

| <Resin solution for light diffusion layer (c)> | |
| --- | --- |
| Acryl polyol (solid content: 50%, Acrydic A-807, Dainippon Ink & Chemicals, Inc.) | 162 parts |
| Isocyanate (solid content: 60%, Takenate D110N, Takeda Chemical Industries, Ltd.) | 32 parts |
| Polymethyl methacrylate resin particles (mean particle diameter: 22.1 $\mu$m, coefficient of variation: 21.1%) | 200 parts |
| Butyl acetate | 215 parts |
| Methyl ethyl ketone | 215 parts |

Comparative Example 1

A light diffusion sheet 1 of the structure shown in FIG. 1 was produced by applying a resin solution for light diffusion layer (d) having the following composition on one surface of a polyethylene terephthalate film 3 of a thickness of 100 $\mu$m (Lumirror T-60, Toray Industries, Inc.) and drying the solution to form a light diffusion layer 2 of a thickness of about 12 $\mu$m.

| <Resin solution for light diffusion layer (d)> | |
| --- | --- |
| Acryl polyol (solid content: 50%, Acrydic A-807, Dainippon Ink & Chemicals, Inc.) | 162 parts |
| Isocyanate (solid content: 60%, Takenate D110N, Takeda Chemical Industries, Ltd.) | 32 parts |
| Polymethyl methacrylate resin particles (mean particle diameter: 8.6 $\mu$m, coefficient of variation: 36.8%) | 160 parts |
| Butyl acetate | 215 parts |
| Methyl ethyl ketone | 215 parts |

Comparative Example 2

A light diffusion sheet 1 of the structure shown in FIG. 1 was produced by applying a resin solution for light diffusion layer (e) having the following composition on one surface of a polyethylene terephthalate film 3 of a thickness of 100 $\mu$m (Lumirror T-60, Toray Industries, Inc.) and drying the solution to form a light diffusion layer 2 of a thickness of about 12 $\mu$m.

| <Resin solution for light diffusion layer (e)> | |
|---|---|
| Acryl polyol (solid content: 50%, Acrydic A-807, Dainippon Ink & Chemicals, Inc.) | 162 parts |
| Isocyanate (solid content: 60%, Takenate D110N, Takeda Chemical Industries, Ltd.) | 32 parts |
| Polystyrene resin particles (mean particle diameter: 8.9 µm, coefficient of variation: 37.0%) | 220 parts |
| Butyl acetate | 215 parts |
| Methyl ethyl ketone | 215 parts |

Comparative Example 3

A light diffusion sheet 1 of the structure shown in FIG. 1 was produced by applying a resin solution for light diffusion layer (f) having the following composition on one surface of a polyethylene terephthalate film 3 of a thickness of 100 µm (Lumirror T-60, Toray Industries, Inc.), drying the solution, and irradiating the applied layer with an UV ray from a high pressure mercury lamp for 1 or 2 seconds to form a light diffusion layer 2 of a thickness of about 6 µm.

| <Resin solution for light diffusion layer (f)> | |
|---|---|
| Ionizing radiation curable acrylic resin (solid content: 50%, Unidic 17-813, Dainippon Ink & Chemicals, Inc.) | 100 parts |
| Photopolymerization initiator (Irgacure, Ciba Specialty Chemicals K.K.) | 1 part |
| Polymethyl methacrylate resin particles (mean particle diameter: 5.8 µm, coefficient of variation: 7.8%) | 1.6 parts |
| Propylene glycol monomethyl ether | 200 parts |

The light diffusion sheets 1 obtained in Examples 1–3 and Comparative Examples 1–3 as described above were evaluated for luminance improvement, light diffusing property and damage resistance of uneven surface of light diffusion layer 2. And surface conditions, i.e., 3D-arithmetical mean deviation and ten point height of irregularities, and optical characteristics, i.e., total light transmission and haze, of these light diffusion sheets 1 were also measured.

Evaluation of improvement in luminance

Figure 2:
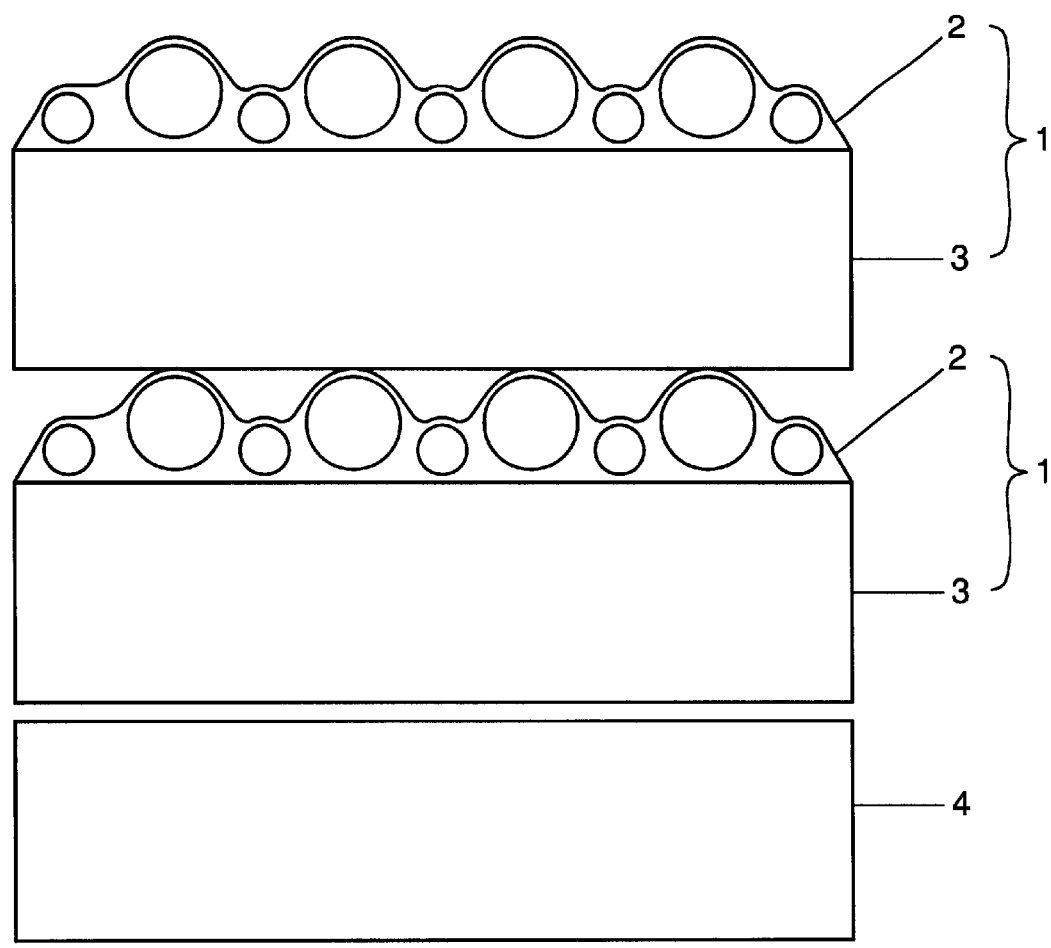
FIG. 2 shows a sectional view of an exemplary application of a light diffusion sheet according to the present invention used in combination with a backlight unit.
Figure 3:
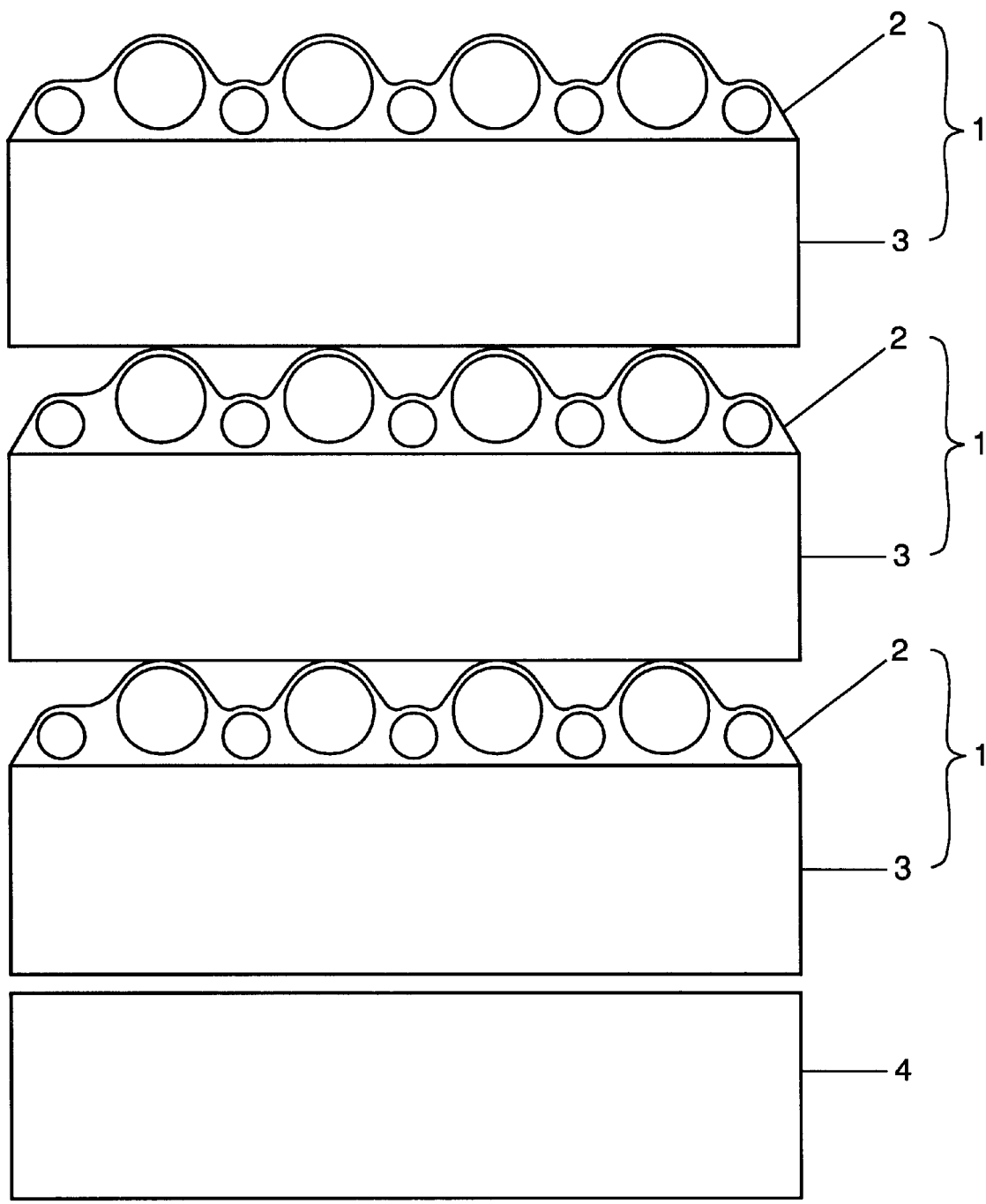
FIG. 3 shows a sectional view of another exemplary application of a light diffusion sheet according to the present invention used in combination with a backlight unit.

Two (FIG. 2) or three (FIG. 3) of the light diffusion sheets 1 of Examples 1–3 and Comparative Examples 1–3 were built into a backlight unit 4 for 5.8-inch liquid crystal display (comprising one of U-shaped lamp and a light conductive plate of a thickness of 5 mm) so that the transparent supports 3 of the light diffusion sheets 1 faced the light conductive plate, and luminance was measured from the front direction. Separately, luminance of the backlight unit itself was measured from the front direction. Thus, improvement in luminance obtained by incorporating the light diffusion sheets was evaluated.

Specifically, luminance improvement values were calculated in accordance with the following equation.

[Luminance from front direction measured with light diffusion sheet $(cd/m^2)$]−[Luminance from front direction measured for backlight unit itself (without light diffusion sheet) $(cd/m^2)$]=[Luminance improvement value $(cd/m^2)$]

The results are shown in Table 1.

Evaluation of Light-Diffusing Property

In the evaluation of the luminance improvement, invisibility of light diffusion pattern of the light conduction plates was simultaneously evaluated by visual inspection. The results are indicated by " when the light diffusion pattern could not be observed, and with "x" when the light diffusion pattern could be observed. The evaluation results are shown in Table 1.

Resistance to Damage of Uneven Surface of Light Diffusion Layer

Uneven surfaces of the light diffusion layers 2 of the light diffusion sheets 1 obtained in Examples 1–3 and Comparative Examples 1–3 were evaluated as follows using a surface measurement apparatus (HEIDON-14, Shinto Scientific Co., Ltd.). Two light diffusion sheets 1 of each type were prepared. The uneven surfaces of the light diffusion layers 2 were brought in contact at a pressure of 1 kPa and slid across each other at a speed of 5 m/min. The damage to the uneven surfaces of the light diffusion layers 2 was then examined. The results were indicated by " when no change in appearance of the uneven surfaces was observed, by "Δ" when one to nine streaks were observed, and by "x" when ten or more streaks were observed. The evaluation results are shown in Table 2.

Measurement of arithmetical mean deviation and ten point height of irregularities of uneven surface of light diffusion sheet Three-dimensional surface roughness analysis was performed for the light diffusion sheets 1 of Examples 1–3 and Comparative Examples 1–3 by using a surface analysis apparatus (SAS-2010 SAU-II, produced by Meishin Koki Co., Ltd.) to measure three-dimensional arithmetical mean deviation and ten point height of irregularities. The measurement results are shown in Table 2.

Measurement of total light transmission and haze of light diffusion sheet

Total light transmission and haze of the light diffusion sheets 1 obtained in Examples 1–3 and Comparative Examples 1–3 were measured using a haze meter (HGM-2K: Suga Test Instruments Co., Ltd.). The total light transmission and haze were measured by applying light from the back surfaces of the light diffusion sheets 1. The measurement results are shown in Table 1.

TABLE 1

| | Example 1 | Example 2 | Example 3 | Comparative Example 1 | Comparative Example 2 | Comparative Example 3 |
|---|---|---|---|---|---|---|
| Light-diffusing property Two of light diffusion sheets were incorporated on light conductive plate of backlight unit | ◯ | ◯ | ◯ | ◯ | ◯ | X |
| Front luminance $(cd/m^2)$ | 4960 | 4950 | 4940 | 4690 | 4810 | 2770 |
| Luminance improvement value | 2720 | 2710 | 2700 | 2450 | 2570 | 530 |

TABLE 1-continued

|  | Example 1 | Example 2 | Example 3 | Comparative Example 1 | Comparative Example 2 | Comparative Example 3 |
|---|---|---|---|---|---|---|
| (cd/m$^2$) Three of light diffusion sheets were incorporated on light conductive plate of backlight unit |  |  |  |  |  |  |
| Front luminance (cd/m$^2$) | 5340 | 5280 | 5260 | 5130 | 4930 | 2900 |
| Luminance improvement value (cd/m$^2$) | 3100 | 3040 | 3020 | 2890 | 2690 | 660 |
| Front luminance of backlight itself (cd/m$^2$) |  |  |  | 2240 |  |  |
| Total light transmission (%) | 75.8 | 73.0 | 75.7 | 81.5 | 75.6 | 90.6 |
| Haze (%) | 87.4 | 85.1 | 85.0 | 89.3 | 91.1 | 29.0 |

TABLE 2

|  | Example 1 | Example 2 | Example 3 | Comparative Example 1 | Comparative Example 2 | Comparative Example 3 |
|---|---|---|---|---|---|---|
| Resistance to damage of uneven surface of light diffusion layer | ○ | ○ | ○ | x | x | Δ |
| Arithmetical mean deviation ($\mu$m) | 2.64 | 3.78 | 4.36 | 1.09 | 1.11 | 1.01 |
| ten point height of irregularities ($\mu$m) | 13.51 | 17.99 | 19.31 | 6.33 | 6.31 | 4.49 |
| Mean particle diameter ($\mu$m) | 18.2 | 27.3 | 22.1 | 8.6 | 8.9 | 5.8 |
| Coefficient of variation (%) | 31.6 | 42.5 | 21.1 | 36.8 | 37.0 | 7.8 |
| Film thickness ($\mu$m) | 33 | 40 | 27 | 12 | 12 | 6 |
| Binder resin | Thermosetting acrylic resin | Thermosetting acrylic resin | Thermosetting acrylic resin | Thermosetting acrylic resin | Thermosetting acrylic resin | Ionizing radiation curable acrylic resin |
| Resin particles | Polymethyl methacrylate resin | Polymethyl methacrylate resin | Polymethyl methacrylate resin | Polymethyl methacrylate resin | Polystyrene resin | Polymethyl methacrylate resin |

As seen from the results shown in Tables 1 and 2, the light diffusion sheets 1 of Examples 1–3 exhibited excellent luminance and light diffusing properties, since they had a total light transmission of 70.0% or more and a haze of 80.0% or more. Further, because they satisfied the requirements of 3D-arithmetical mean deviation of 2.0 $\mu$m or more and ten point height of irregularities of 10.0 $\mu$m or more, they showed extremely superior evaluation results as for the resistance to damage of uneven surfaces of the light diffusion layers 2.

In contrast, the uneven surfaces of light diffusion layers 2 of the light diffusion sheets 1 obtained in Comparative Examples 1 and 2 were likely to be damaged, because the arithmetical mean deviation was less than 2.0 $\mu$m and ten point height of irregularities was less than 10.0 $\mu$m.

In the light diffusion sheet 1 of Comparative Example 3, the coated film itself was hard, because an ionizing radiation hardening resin was used as the binder resin. However, the uneven surface of light diffusion layers 2 was not necessarily resistant to damage, because the arithmetical mean deviation and ten point height of irregularities were low, i.e., 1.01 $\mu$m and 4.49 $\mu$m, respectively.

What is claimed is:

1. A light diffusion sheet comprising a light diffusion layer formed on a transparent substrate and containing a binder resin and resin particles that impart an uneven surface, said resin particles having a mean particle diameter of 16.0–30.0 $\mu$m, wherein the uneven surface of the light diffusion layer exhibits ten point height of irregularities of 10.0 $\mu$m or more in three-dimensional surface roughness measurement, and wherein said resin particles have a coefficient of variation of particle diameter distribution of less than 50% and are present in an amount of 180–270 parts by weight per 100 parts by weight of said binder resin.

2. A light diffusion sheet comprising a light diffusion layer formed on a transparent substrate and containing a binder resin and resin particles that impart an uneven surface, said resin particles having a mean particle diameter of 16.0–30.0 $\mu$m, wherein the uneven surface of the light diffusion layer exhibits an arithmetical mean deviation of 2.0 $\mu$m or more in three-dimensional surface roughness measurement and ten point height of irregularities of 10.0 $\mu$m or more in three-dimensional surface roughness measurement, and wherein said resin particles have a coefficient of variation of particle diameter distribution of less than 50% and are present in an amount of 180–270 parts by weight per 100 parts by weight of said binder resin.

3. A light diffusion sheet according to claim 2 wherein said binder resin is an optically transparent thermoplastic resin.

4. A light diffusion sheet according to claim 1 wherein said binder resin is an optically transparent thermoplastic resin.

5. A light diffusion sheet according to claim 2 wherein said binder resin is an optically transparent thermoplastic resin.

6. A light diffusion sheet according to claim 3 wherein said light diffusion layer has a back surface opposite said uneven surface and wherein said light diffusion layer has a total light transmission of or more and a haze of 80% or more for light transmitted therethrough from said back surface through said uneven surface.

7. A light diffusion sheet according to claim 4 wherein said light diffusion layer has a back surface opposite said uneven surface and wherein said light diffusion layer has a total light transmission of 70.0% or more and a haze of 80% or more for light transmitted therethrough from said back surface through said uneven surface.

8. A light diffusion sheet according to claim 5 wherein said light diffusion layer has a back surface opposite said uneven surface and wherein said light diffusion layer has a total light transmission of 70.0% or more and a haze of 80% or more for light transmitted therethrough from said back surface through said uneven surface.

9. A light diffusion sheet according to claim 6 wherein said light diffusion layer has a thickness, defined between said uneven surface and said back surface of 25–50 µm.

10. A light diffusion sheet according to claim 7 wherein said light diffusion layer has a thickness, defined between said uneven surface and said back surface of 25–50 µm.

11. A light diffusion sheet according to claim 8 wherein said light diffusion layer has a thickness, defined between said uneven surface and said back surface of 25–50 µm.

12. A light diffusion sheet according to claim 2 wherein said resin particles have a mean particle diameter of 18.0–28.0 µm.

13. A light diffusion sheet according to claim 2 wherein said resin particles are present in an amount of 200–250 parts by weight per 100 parts by weight of said binder resin.

14. A light diffusion sheet according to claim 2 wherein said coefficient of variation of particle diameter distribution is less than 45%.

15. A light diffusion sheet according to claim 2 wherein said coefficient of variation of particle diameter distribution is 20.0% to 50.0%.

16. A light diffusion sheet according to claim 2 wherein said resin particles have a substantially spherical shape.

17. A light diffusion sheet according to claim 1 wherein said resin particles have a mean particle diameter of 18.0–28.0 µm.

18. A light diffusion sheet according to claim 1 wherein said resin particles are present in an amount of 200–250 parts by weight per 100 parts by weight of said binder resin.

19. A light diffusion sheet according to claim 1 wherein said coefficient of variation of particle diameter distribution is less than 45%.

20. A light diffusion sheet according to claim 1 wherein said coefficient of variation of particle diameter distribution is 20.0% to 50.0%.

21. A light diffusion sheet according to claim 1 wherein said resin particles have a substantially spherical shape.

* * * * *

UNITED STATES PATENT AND TRADEMARK OFFICE
CERTIFICATE OF CORRECTION

PATENT NO.    : 6,602,596 B2
DATED         : August 5, 2003
INVENTOR(S)   : Kimura et al.

It is certified that error appears in the above-identified patent and that said Letters Patent is hereby corrected as shown below:

<u>Title page,</u>
Item [56], References Cited, FOREIGN PATENT DOCUMENTS, "G02B /5/02" should read -- G02B 05/02 --.

<u>Column 8,</u>
Line 12, change " " when" should read -- "○ when --; and
Line 28, change " " when" should read -- "○ when --.

Signed and Sealed this

Twenty-seventh Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,602,596 B2  
DATED : August 5, 2003  
INVENTOR(S) : Kimura et al.

It is certified that error appears in the above-identified patent and that said Letters Patent is hereby corrected as shown below:

<u>Title page,</u>  
Item [56], References Cited, FOREIGN PATENT DOCUMENTS, "G02B /5/02" should read -- G02B 05/02 --.

<u>Column 8,</u>  
Line 12, " " when" should read -- "O when --; and  
Line 28, " " when" should read -- "O when --.

Signed and Sealed this

Eleventh Day of May, 2004

JON W. DUDAS  
*Acting Director of the United States Patent and Trademark Office*